(12) United States Patent
Hooker

(10) Patent No.: US 7,000,081 B2
(45) Date of Patent: Feb. 14, 2006

(54) WRITE BACK AND INVALIDATE MECHANISM FOR MULTIPLE CACHE LINES

(75) Inventor: Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 238 days.

(21) Appl. No.: 10/365,665

(22) Filed: Feb. 12, 2003

(65) Prior Publication Data

US 2004/0158681 A1   Aug. 12, 2004

Related U.S. Application Data

(60) Provisional application No. 60/356,418, filed on Feb. 12, 2002.

(51) Int. Cl.
G06F 12/00    (2006.01)
G06F 15/00    (2006.01)

(52) U.S. Cl. .................. 711/143; 711/140; 711/135; 711/137; 712/226; 712/207

(58) Field of Classification Search ................ 711/143, 711/140, 135, 137; 712/1, 200, 226, 207
See application file for complete search history.

(56) References Cited

U.S. PATENT DOCUMENTS

| 5,377,345 A | 12/1994 | Chang et al. |
|---|---|---|
| 5,524,233 A | 6/1996 | Milburn et al. |
| 5,526,508 A | 6/1996 | Park et al. |
| 5,822,778 A | 10/1998 | Dutton et al. |
| 5,845,325 A * | 12/1998 | Loo et al. .................... 711/135 |
| 5,893,155 A | 4/1999 | Cheriton |
| 6,408,363 B1 | 6/2002 | Lesartre et al. |
| 2004/0059872 A1 * | 3/2004 | Genduso et al. ............ 711/135 |
| 2004/0215896 A1 * | 10/2004 | McCalpin .................... 711/144 |

FOREIGN PATENT DOCUMENTS

EP        0947919 A    10/1999

* cited by examiner

Primary Examiner—Kimberly McLean-Mayo
(74) Attorney, Agent, or Firm—Richard K. Huffman; James W. Huffman

(57) ABSTRACT

A microprocessor apparatus is provided that enables write back and invalidation of a block of cache lines from memory. The apparatus includes translation logic and execution logic. The translation logic translates a block write back and invalidate instruction into a micro instruction sequence that directs a microprocessor to write back and invalidate a block of cache lines from cache to memory, where the number of cache lines in the block has been previously entered in a register in the microprocessor by a preceding micro instruction. The execution logic is coupled to the translation logic. The execution logic receives the micro instruction sequence, and issues transactions over a memory bus that writes back data corresponding to each of the cache lines within the block.

30 Claims, 6 Drawing Sheets

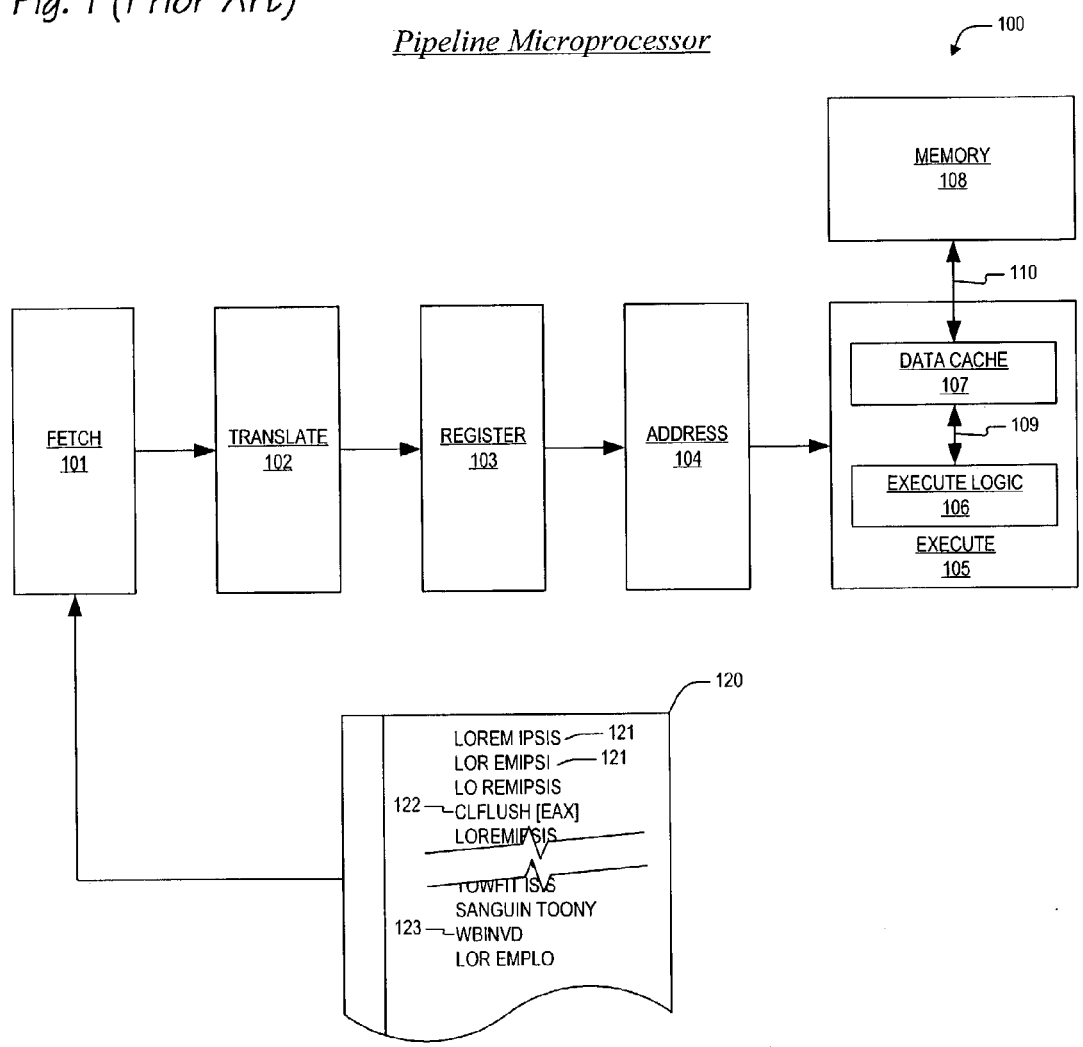

*Fig. 2 [Prior Art]*
*Cache Unit Interface for Cache Line Flush Operations*
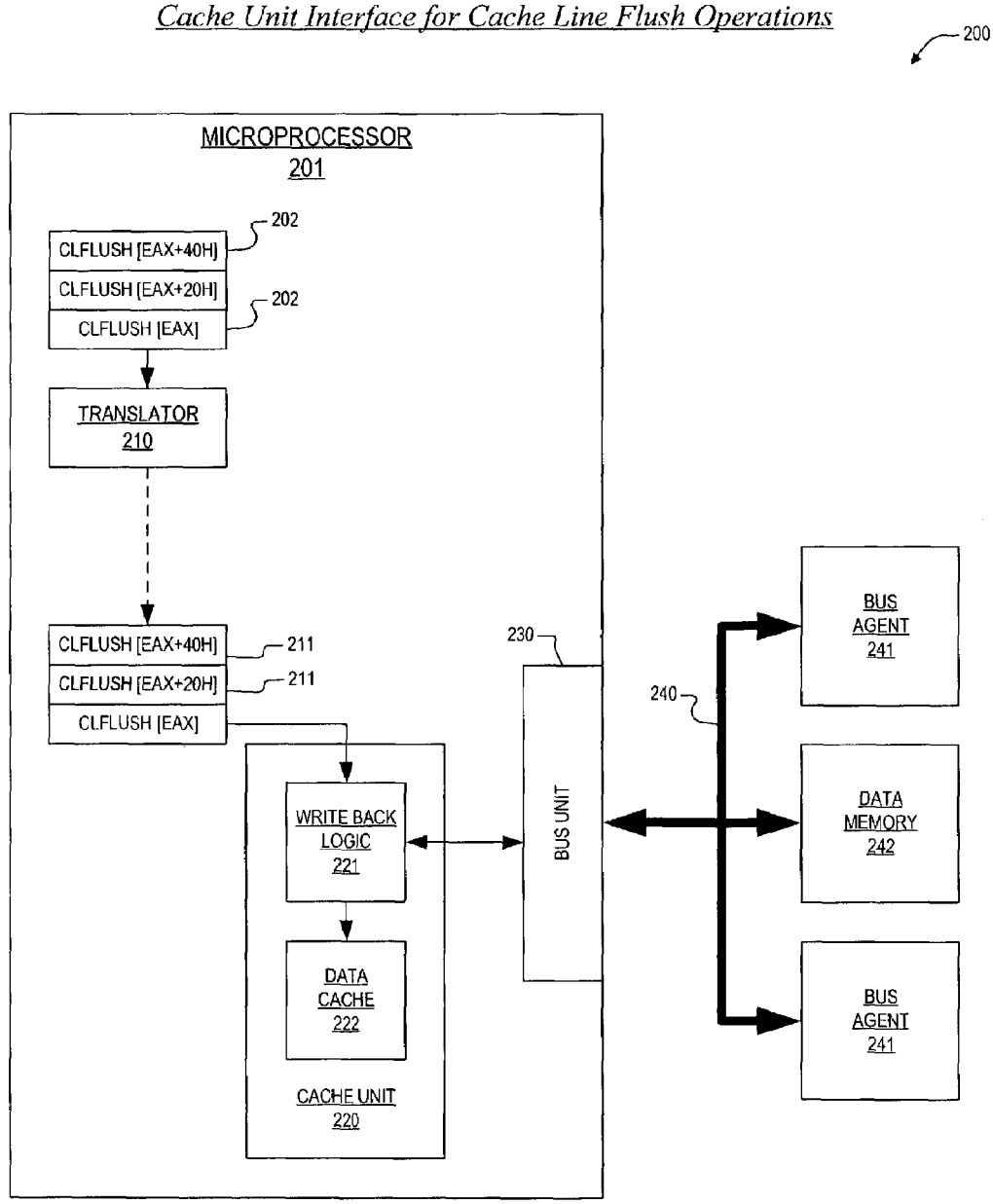

Fig. 3 (Prior Art)

*Bus Transactions for Cache Line Flush Operations*

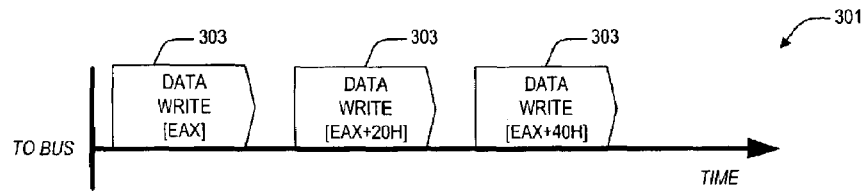

Fig. 4

*Extended Block Write Back and Invalidate Macro Instruction*

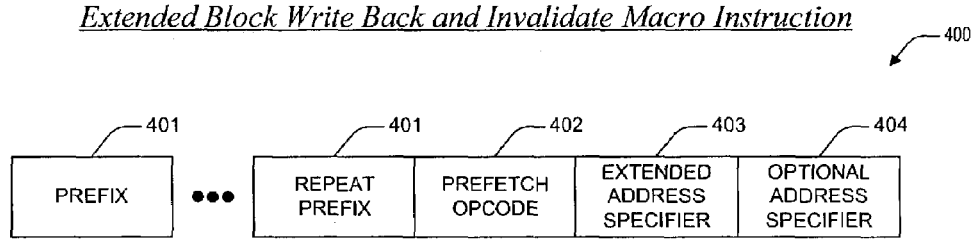

Fig. 5

*Encoding for Extended Address Specifier*

| BITS 5:3 | OPERATION | DESCRIPTION |
|---|---|---|
| 000 | PREFETCHNTA | PREFETCH SPECIFIED DATA USING NTA HINT |
| 001 | PREFETCHT0 | PREFETCH SPECIFIED DATA USING T0 HINT |
| 010 | PREFETCHT1 | PREFETCH SPECIFIED DATA USING T1 HINT |
| 011 | PREFETCHT2 | PREFETCH SPECIFIED DATA USING T2 HINT |
| 100 | PREFETCH.WB | PREFETCH SPECIFIED DATA USING .WB HINT |
| 101 | ILLEGAL | ILLEGAL OPCODE |
| 110 | ILLEGAL | ILLEGAL OPCODE |
| 111 | ILLEGAL | ILLEGAL OPCODE |

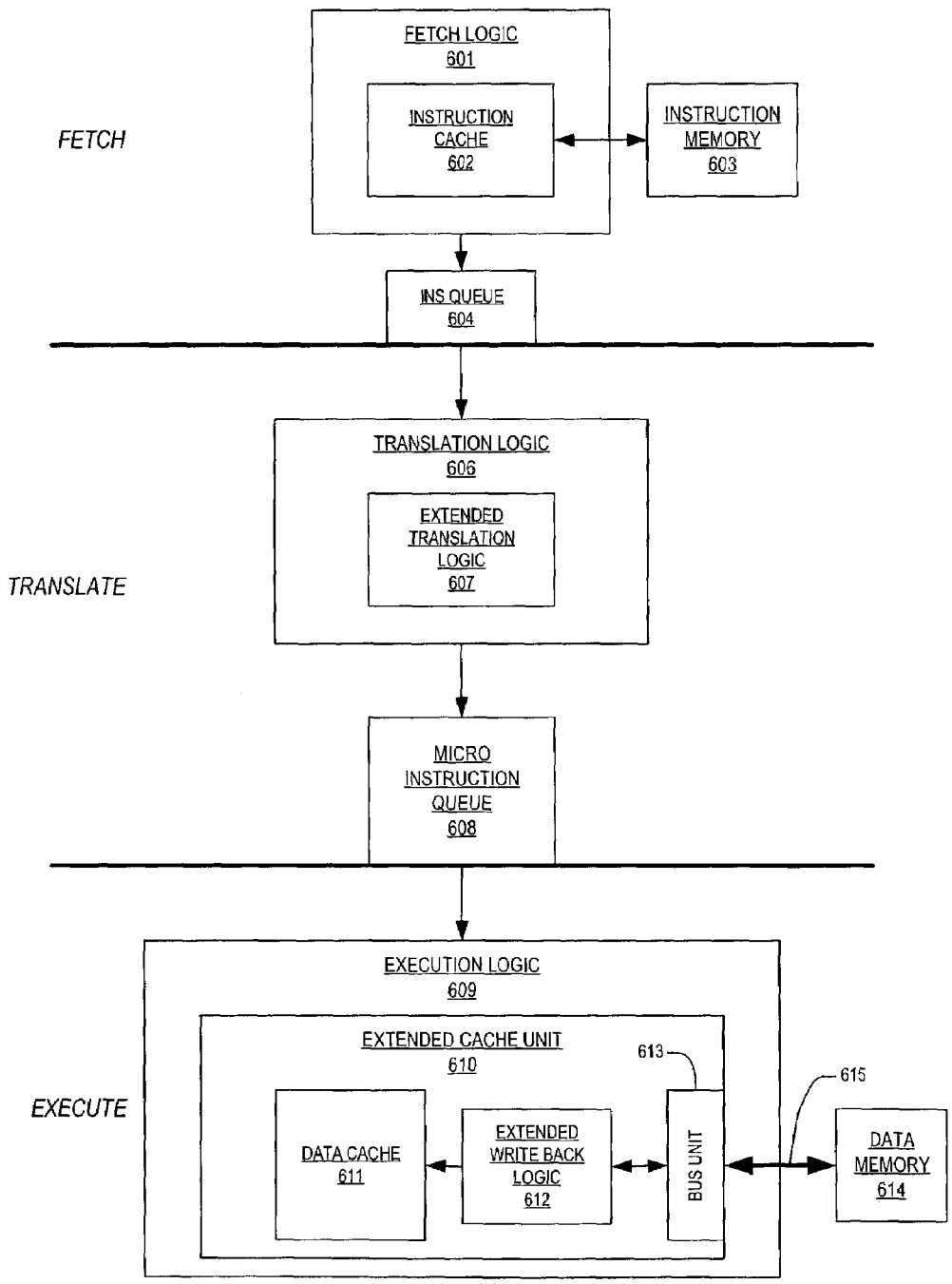

*Cache Unit Interface for Block Write Back and Invalidate Operation*

*Method for Block Write Back and Invalidate Operation*

WRITE BACK AND INVALIDATE MECHANISM FOR MULTIPLE CACHE LINES

CROSS-REFRERNCE TO RELATED APPLICATIONS

This application claims the benefit of U.S. Provisional Application Ser. No. 60/356418 filed on Feb. 12, 2002.

BACKGROUND OF THE INVENTION

1. Field of the Invention

This invention relates in general to the field of microelectronics, and more particularly to an apparatus and method that enable a programmer to direct a microprocessor to perform write back and invalidate operations to flush a specified number of cache lines from its internal cache.

2. Description of the Related Art

In a present day microprocessor, the speed at which data can be transferred between internal logic blocks is an order of magnitude faster than the speed that external memory accesses exhibit. In an x86 desktop computer configuration, the bus which interfaces to system memory operates on the order of hundreds of megahertz while internal microprocessor clock speeds are approaching the tens of gigahertz. Consequently, a hierarchy of cache structures has evolved over more recent years to allow high-performance microprocessors to run at speed without having to execute transactions over a slow memory bus every time data is to be read or written.

An on-board, or local, cache in a pipeline microprocessor is a stand-alone unit in nature that operates in a manner that is transparent to the flow of instructions in the microprocessor pipeline to ensure that data which is going to be required by instructions in an application program is resident within the cache and can hence be accessed at pipeline speeds rather than at memory bus speeds. Cache architectures are varied in the art, some consisting of multiple levels of cache: a first level cache very near to a processor's execution logic, a second level cache which may be on-chip or off chip where less frequently accessed data are stored, third-level caches which may be on a memory card itself, and so on. Regardless of whichever architecture is employed, one skilled in the art will appreciate that the overall objective of a cache is to preclude the case where instructions in a microprocessor pipeline are stalled while a bus transaction over a slow memory bus is issued in order to obtain data that is needed by a pending read or write operation. When this happens, program execution comes to a grinding halt until the data arrives.

To complicate matters, present day computer systems also share regions of memory between devices. For instance, a primary microprocessor communicates with a communications microprocessor by reading data from and writing data to a specified region of memory. It is also very common to find areas of memory known as video buffers that are shared between a primary microprocessor and a microprocessor on a video card that is responsible for displaying data to an operator on a video device.

In an shared memory system, the possibility exists that data from a shared region can be in the local caches of two different microprocessors or other devices connected to a memory bus. And as long as all of the devices do nothing more than read the data, then no harm is done by allowing both of them to have the data in their local cache structures. But unpredictable consequences could result if they were both allowed to modify the data that is locally cached.

To prevent this from happening, system designers have developed cache consistency protocols that indicate the status of data in a cache. The most prevalent protocol is known as MESI. Maintaining a local cache according to MESI ensures that two copies of the same data cannot be modified at the same time. A MESI shared state indicates to a local cache whether or not a particular block of data is shared. If it is shared, then the local processor cannot modify it without first conducting transactions over the slower memory bus to obtain exclusive permission to modify the data. To modify data, a processor must first obtain exclusive ownership of the data.

The problem addressed by the invention described herein relates to the delays that are incurred in a program where it is desired to write back data that has been modified in a local cache to memory. One skilled in the art will appreciate that a cache has no reasonable way of knowing when a particular area of memory will first be required, and so memory bus delays are always incurred when the particular area of memory is first loaded into local cache. Recognizing this fact, designers have developed a prefetch instruction that can be programmed for execution by a microprocessor. The prefetch instruction, however, does not operate on operands in the program flow. Rather, the prefetch instruction is directs a local cache to load operands from memory into the cache that will be used in the future. And since cache units operate with memory in a manner that is transparent to instruction flow in a microprocessor pipeline, it is prudent to issue a prefetch instruction prior to needing data so that the cache can fetch the data from memory prior to the time it is needed—in parallel with the execution of other instructions in the primary program flow. Then when a subsequent instruction comes along that needs access to the prefetched data, it is readily accessible from cache and program execution is not stalled while waiting for it to be fetched from memory. Prefetched data is readily accessible in cache, that is, so long as it is going to be read. If it is to be modified by a subsequent instruction, then the program execution may have to be delayed while a cache unit goes to the bus to request exclusive ownership of shared data so that it can be modified by the local processor.

As alluded to above, shared memory regions are widely employed in present day computing systems to allow for communication of information between devices. In the case of a communication buffer between devices connected to a bus, the presence or absence of certain data in a data area (i.e., the designated area is set to one logical value, say all zeros or all ones) may indicate to one device that another device is ready to receive data. Alternatively, in a video buffer configuration, a microprocessor may start "painting" a background color for display to an operator by setting all of the video buffer entries to the same value. Both of the above examples require that particular data be stored to data entities within the data area in order to transfer information from one device or another. But once the data has been modified in cache, many applications require that the data be written back, or flushed, from cache to memory so that the other devices can access the data. Alternatively, once a microprocessor has finished modifying a large chunk of data within its local cache, say in the case of generating a portion of an image to display to an operator via a video buffer interface, then it is very advantageous in terms of cache management to flush the modified data from the cache out to the memory bus. Once the data has been written back to memory, the area that it formerly occupied within the local cache becomes available for caching of new data.

Most instruction set architectures provide instructions that allow a programmer to direct a conforming microprocessor to flush a single cache line. For example, the x86 instruction CLFLUSH directs an x86-compatible microprocessor to write back and invalidate contents of a single cache line. Alternatively, some instruction sets provide an instruction that enables a programmer to direct a conforming microprocessor to flush all of the modified lines in a cache to memory. The x86 instruction WBINVD directs an x86-compatible microprocessor to write back and invalidate all modified cache lines within a local data cache. Like the prefetch instruction, these two types of write back and invalidate instructions operate in a manner that is transparent to the flow of instructions through the execution stages of a microprocessor pipeline in that they are provided to cache instead of computation logic. Yet, cache units have a finite capability to post write operations to a memory bus. Once their write buffer is full of pending writes to the bus, then subsequent write operations must be stalled until space becomes available in the write buffer.

There are many operations performed by an application program are not restricted to data within a single cache line, nor are they so complex that their data fills an entire cache structure. Instead, many operations modify data structures that comprise multiple cache lines that occupy a significant portion of a local cache, but not the entire local cache. And to flush the data structures to memory, a programmer must employ a number of single-line flush instructions that is equivalent to the size of the portion of local cache that the data structures occupy. This could conceivably result in thousands of single-line flush instructions in a program flow. And because the data structures only occupy a significant portion of the cache, to flush all of the modified lines in the cache would be inefficient use of memory bus bandwidth. Hence, instructions like WBINVD are virtually never employed because of their devastating effects on program execution speed. To execute WBINVD would result in stalling subsequent pending store operations for an intolerable period of time.

Therefore, what is needed is an apparatus and method that enable a programmer to direct a microprocessor to write back and invalidate multiple cache lines via execution of a single instruction.

SUMMARY OF THE INVENTION

The present invention, among other applications, is directed to solving these and other problems and disadvantages of the prior art. The present invention provides a superior technique for flushing an area of cache to memory that only requires two instructions within a program flow. In one embodiment, a microprocessor apparatus is provided for write back and invalidation of a block of data from cache to memory. The apparatus includes translation logic and execution logic. The translation logic translates a block write back and invalidate instruction into a micro instruction sequence that directs a microprocessor to write back and invalidate a specified number of cache lines, where the specified number has been previously entered in a register in the microprocessor by a preceding micro instruction, and where the block write back and invalidate instruction comprises a modification to an existing prefetch instruction within an existing instruction set, and where the existing prefetch instruction does not otherwise provide for write back and invalidation of the specified number of cache lines. The execution logic is coupled to the translation logic. The execution logic receives the micro instruction sequence, and issues transactions over a memory bus that write back data corresponding to said specified number of said cache lines.

One aspect of the present invention contemplates an apparatus in a microprocessor for performing a block write back and invalidate operation. The apparatus includes a block write back and invalidate instruction and a translator. The block write back and invalidate instruction directs the microprocessor to write back and invalidate a prescribed number of cache lines, where the prescribed number has been previously entered in a register in the microprocessor by a preceding micro instruction, and where the block write back and invalidate instruction comprises a modification to an existing prefetch instruction within an existing instruction set, and where the existing prefetch instruction does not otherwise provide for write back and invalidation of the prescribed number of cache lines. The translator receives the block write back and invalidate instruction, and translates the block write back and invalidate instruction into associated micro instructions. The associated micro instructions direct execution logic within the microprocessor to issue bus transactions over a memory bus that writes back data corresponding to the prescribed number of cache lines.

Another aspect of the present invention comprehends a method for flushing a block of cache lines from cache. The method includes retrieving a block write back and invalidate macro instruction; translating the block write back and invalidate macro instruction into a micro instruction sequence, where the micro instruction sequence directs a microprocessor to write back and invalidate the block of cache lines, and where the number of cache lines in the block has been previously entered in a register in the microprocessor by a preceding micro instruction; and, responsive to the micro instruction sequence, invalidating each cache line in the block of cache lines in a local cache, and issuing bus transactions over a memory bus to write back data corresponding to each of the cache lines to memory. The retrieving includes providing the block write back and invalidate instruction as a modification of an existing prefetch instruction within an existing instruction set wherein the existing prefetch instruction does not otherwise provide for write back and invalidation of the block cache lines

BRIEF DESCRIPTION OF THE DRAWINGS

These and other objects, features, and advantages of the present invention will become better understood with regard to the following description, and accompanying drawings where:

FIG. 1 is a block diagram illustrating significant pipeline stages in a present day microprocessor;

FIG. 2 is a block diagram depicting a cache unit interface to memory for performing cache line flush operations within the microprocessor of FIG. 1;

FIG. 3 is a timing diagram illustrating transactions that are issued over a memory bus by the microprocessor of FIGS. 1 and 2 to perform the cache line flush operations;

FIG. 4 is a block diagram showing an extended block write back and invalidate instruction according to the present invention;

FIG. 5 is a table illustrating how an extended address specifier field within the extended block write back and invalidate instruction of FIG. 4 is encoded to direct a microprocessor to write back and invalidate a specified number of cache lines to memory;

FIG. 6 is a block diagram detailing a microprocessor according to the present invention for performing a block write back and invalidate operation;

DETAILED DESCRIPTION

Figure 7:
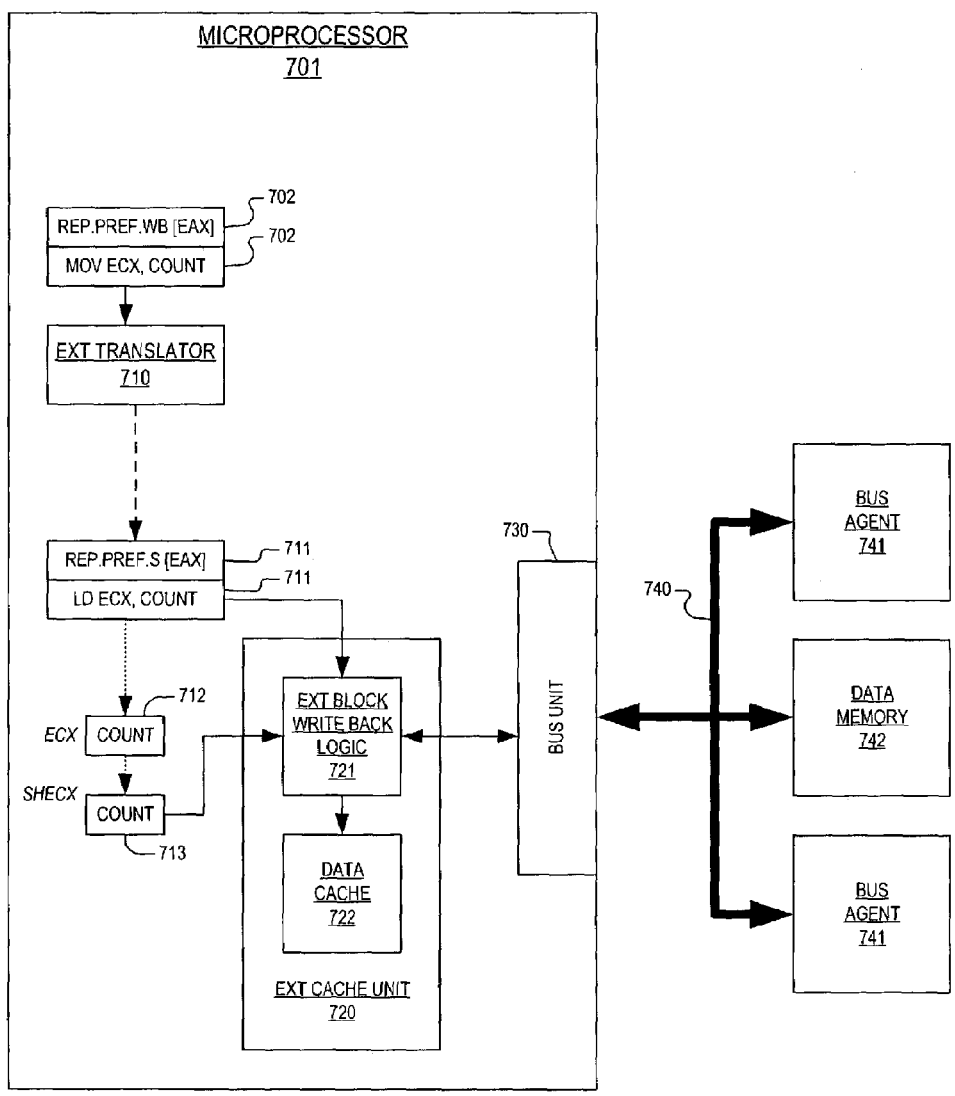
FIG. 7 is a block diagram depicting a cache unit interface to memory for performing a block write back and invalidate operation within the microprocessor of FIG. 6.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on how a present day pipeline microprocessor executes multiple cache line flush operations, an example highlighting the limitations of present day techniques will now be presented with reference to FIGS. 1–3. Following this, a discussion of the present invention will be presented with reference to FIGS. 4–8. The present invention enables a programmer, via a single macro instruction, to direct a microprocessor to write back and invalidate a specified number of cache lines from internal cache to memory.

Turning now to FIG. 1, a block diagram is presented illustrating significant pipeline stages 101–105 in a present day pipeline microprocessor 100. The microprocessor 100 has a fetch stage 101, a translate stage 102, a register stage 103, an address stage 104, and an execute stage 105.

In operation, the fetch stage 101 retrieves macro instructions 121–123 from an instruction area 120 of system memory for execution by the microprocessor 100. The macro instructions 121–123 are provided to the translate stage 102. The translate stage 102 translates the macro instructions 121–123 into corresponding sequences of micro (or native) instructions (not shown) that direct the microprocessor 100 to perform operations which are specified by the macro instructions 121–123. The micro instructions proceed through subsequent stages 103–105 of the pipeline in synchronization with a pipeline clock signal (not shown), very similar to the manner in which work products proceed through successive stations in an assembly line. Accordingly, micro instructions are provided to the register stage 103. If a particular micro instruction specifies an operand that is stored within a register in the register stage 103, then logic therein accesses the register to retrieve the operand and the operand is forwarded along with the particular micro instruction to the address stage 104. The address stage 104 contains logic to generate addresses used to access operands that are stored in data memory 108. Like the register stage 103, the address stage 104 forwards generated addresses along with their corresponding micro instructions to the execute stage 105.

The execute stage 105 performs the operations that are specified by the micro instructions. In a present day microprocessor 100, the types of operations vary according to instruction set architecture, however one skilled in the art will appreciate that these operations fall into general categories such as logical operations, arithmetic operations, and memory access operations (i.e., data read and data write operations). Results generated by performing the prescribed operations are either stored back into registers in the register stage 103 or they are written to locations in data memory 108.

One skilled in the art will appreciate that a modern pipeline microprocessor 100 may have many more stages than those 101–105 shown in FIG. 1 because increasing the number of stages in a pipeline by decomposing major functions within the pipeline is a proven technique for increasing the throughput of instructions 121–123 through the pipeline. For clarity purposes however, the pipeline stages 101–105 of the present day microprocessor 100 shown in FIG. 1 present major groupings of functions to illustratively teach shortcomings of the prior art without burdening the reader with irrelevant details.

It is notable that a present day microprocessor 100 provides a data cache 107 within the execute stage 105 along with execute logic 106. The data cache 107 operates in parallel with the execution of instructions in the pipeline stages 101–105 to ensure that data which has a high probability of being accessed by the instructions 121–123 of an application program are present within the cache 107 so that when a data access micro instruction (i.e., a load memory or store memory micro instruction) proceeds through the execute stage 105, the execute logic 106 is able to execute the data access in one or two pipeline clock cycles rather than incurring a program delay of perhaps hundreds of clock cycles while waiting for the data access to be executed to system data memory 108 over a memory bus 110. In an efficient cache system configuration, data load and store operations occur predominately between the execute logic 106 and the data cache 107 over a cache bus 109, and the data cache 107 operates in a manner that is relatively transparent to the flow of micro instructions through the pipeline stages 102–105 to ensure that cached copies of data entities are synchronized and consistent with system memory 108.

The prevailing protocol for ensuring the consistency of cache entries in a system configuration that shares regions of memory 108 is known as MESI (modified, exclusive, shared, invalid). Although not depicted in FIG. 1, other devices (not shown) in a computing system configuration may share certain areas of memory 108 for the purposes of operating on the same data. For example, a video card may share a region of memory 108 with the microprocessor 100 to enable access of data for display on a monitor which has been generated by the microprocessor 100. In another example, multiple devices on the system bus 110 may communicate among themselves by writing data to and reading data from shared areas of data memory 108. It is beyond the scope of the present application to provide a detailed description of the architectural considerations that provide the motivation for use of the MESI protocol; what is sufficient herein is to understand that the MESI prevails in the art for ensuring data consistency between system memory 108 and local cache structures 107.

Because transactions over the memory bus 110 take hundreds of clock cycles to complete, data is transferred to and from the data cache 107 in blocks consisting of a number of bytes. These blocks are called cache lines. Although cache line widths (i.e., the size of a cache line in bytes) can vary according to architecture, it is not uncommon today to find system configurations that exhibit 32-byte line widths, or 64-byte line widths, or even 128-byte line widths.

Even the most efficient cache structures 107 must incur delay to initially transfer data from memory 108 to cache 107 over the memory bus 110. But once a cache line has been provided to the cache 107, subsequent accesses to data entities within the cache line can be accomplished without incurring significant delay because the speed of a cache 107 and the cache bus 109 is commensurate with the speed of other logic within the microprocessor 100, say, the execute logic 106.

According to MESI, a cache line within a local data cache 107 may be in one of four states: modified, exclusive, shared, and invalid. A modified line is one to which a local store operation has been executed, but which has not yet been synchronized with main memory 108. It is the responsibility of a local cache 107 to monitor memory transactions over the memory bus 110 from other devices (also known as bus agents) so that if they request data from a modified cache line, the local cache 107 provides the modified data to the requesting bus agent. This monitoring of the bus 110 is known as bus snooping. A cache line in the exclusive state is one to which the local cache 107 may execute a store operation. The exclusive state implies that the local cache 107 possesses exclusive ownership of the cache line; the microprocessor 100 is thus allowed modify its contents. A shared cache line is one that is resident within the local caches 107 of two or more devices on the bus 110. As such, each device may read data from a shared cache line, but they are not allowed to modify its contents. In order to modify data (i.e., to execute a store operation) in a shared cache line, a device 100 must first conduct appropriate transactions over the memory bus 110 with the other devices to obtain exclusive ownership of the cache line (i.e., to read the cache line into its cache 107 in the exclusive MESI state) prior to modifying its contents. Once exclusive ownership of the line is obtained, then the store operation may be executed and the cache line state is changed to modified. Requiring exclusive ownership of a cache line before posting store operations guarantees data consistency in that only one device 100 can modify the contents of a cache line at any point in time. A cache line's state is changed to invalid when the local cache 107 detects (by snooping) a write transaction over the memory bus 110 to that cache line, or when a bus transaction is issued over the bus 110 by another device to obtain exclusive ownership of the line. Marking a line as invalid indicates that the data within is not to be read or written because it is most likely inconsistent with memory 108.

Because a data cache 107 operates in parallel with the flow of instructions through a microprocessor pipeline, designers have provided prefetch macro instructions to load data into a cache 107 before access to the data is required in a program flow 120, thereby overcoming the delay that is incurred when data must initially be retrieved from memory 108 into the cache 107. A prefetch instruction is generally provided in a program flow 120 to direct the local data cache 107 to load a cache line from memory 108 in parallel with the execution of subsequent instructions so that the cache line will be in the cache 107 at the point in the program flow 120 where a subsequent instruction accesses data from within the cache line. If judiciously placed within a program flow 120, prefetch instructions are very efficient for overcoming the delay associated with initially accessing data in a data cache 107 and can thereby provide for substantial increases in program execution speed. When transactions over the memory bus 110 for the prefetch operation are completed, the requested cache line is present in cache 107 in either an exclusive state (if the local cache 107 has the only copy of the cache line) or a shared state (if another device also has a cached copy of the requested line) In either state, data entities within the cached line are available for immediate read access. But as noted above, in order to write data to a cache line (i.e., to perform a store operation), exclusive ownership of the line is required. Consequently, if the prefetch operation resulted in caching the line in an exclusive state, then a pending store may be immediately posted to the line. But if the line was provided from the bus 110 in a shared state, then a pending store must be stalled while the cache unit 107 issues transactions over the bus 110 to perfect exclusive ownership of the line. After the line is provided to the cache 107 in the exclusive state, then the pending store can be posted.

As noted above, there are instructions 122, 123 within present day instruction sets that allow a programmer to write back the contents of a cache 107 to memory 108. On one hand, there may be latency issues related to communication between devices that a programmer can satisfy by directing the cache unit 107 to write back data to memory 108. On the other hand, the efficient use of cache resources may be of issue to a programmer, and "releasing" significant portions of the cache 107 following their use can improve performance. Regardless of the motivation, most instruction set architectures today provide one or more instructions 122, 123 that enable a programmer to direct the cache unit 107 to write back data to memory 108. But the present inventors have noted that these instructions 122, 123 are limited in that one type of instruction 122, CLFLUSH [EAX], provides for write back of a single cache line, and the other type of instruction 123, WBINVD, provides for write back of all of the modified lines in a cache 107. But there is not single instruction that allows a programmer to direct a microprocessor 100 to flush a specified number of cache lines from cache 107. For instance, a 32-kilobyte communications buffer that has been loaded into a cache occupies 1000 32-byte cache lines. And to flush the communications buffer to memory 108 would required programming 1000 single-line flush instructions 122 or a single cache flush instruction 123, WBINVD, which would flush all modified lines in the cache 107 to memory, perhaps an order of magnitude more in number that the size of the communications buffer. It is noted that x86 instructions are employed in the example of FIG. 1 because they are widely recognized in the art however, one skilled in the art will appreciate that other instruction set architectures provide cache management instructions that direct the same types of write back operations.

Now referring to FIG. 2, a block diagram 200 is provided depicting a cache unit interface to memory for performing cache line flush operations within the microprocessor of FIG. 1. The block diagram 200 shows logic within the microprocessor 201 that is employed to perform the cache line flush operations. The microprocessor 201 has a translator 210 that receives a flow of macro instructions 202 and translates the macro instructions 202 into associated micro instructions 211. Micro instructions 211 that direct data load and store operations from and to memory 242 are subsequently provided to a cache unit 220. The cache unit 220 includes write back logic 221 and a data cache 222. The write back logic 221 is coupled to a bus unit 230. The bus unit 230 interfaces to a system memory bus 240, to which the data memory 242 and other bus agents 241 are coupled.

An exemplary flow of macro instructions 202 illustrates how cache line write back operations are prescribed. Accordingly, a first macro instruction 202, CLFLUSH [EAX], in the exemplary flow directs the microprocessor 201 to write back and invalidate a first cache line whose address corresponds to the contents of register EAX. A second macro instruction 202, CLFLUSH [EAX+20H], directs the microprocessor 201 to write back and invalidate a second cache line whose address corresponds to the contents of register EAX+20H (presuming that the data cache 222 has 32-byte cache line widths). A third macro instruction 202, CLFLUSH [EAX+40H], directs the microprocessor 201 to write back and invalidate a second cache line whose address corresponds to the contents of register EAX+40H. The above-detailed write back and invalidate operation merely flush an area within the data cache 222 that comprises three sequential cache lines. One skilled in the art will appreciate that to flush 100 lines would require 100 write back and invalidate line instructions 202 with successively increasing addresses prescribed.

The translator 210 translates the three write back and invalidate macro instructions 202 into a corresponding write back and invalidate micro instructions 211, CLFLUSH [EAX], CLFLUSH [EAX+20H], CLFLUSH [EAX+40H], which are successively provided to the cache unit 220. IN response, the write back logic 221 directs the bus unit 230 to issue three successive write back and invalidate transactions over the memory bus 240 to flush the three cache lines from cache 222 to memory 242.

Now turning to FIG. 3, a timing diagram 300 is presented that illustrates bus transactions 303 which are issued over a memory bus 240 by the microprocessor 201 of FIGS. 1 and 2 to perform multiple cache line flush operations. The transactions 303 are directed from bus unit 230 to the memory bus 240. One skilled in the art will appreciate that there are other transactions that transpire between the memory bus 240 and the bus unit 230, such as those which are required for the microprocessor 201 to gain access to the bus (i.e., BUS REQUEST, BUS GRANT, etc.), but for clarity purposes, only those transactions 303 which are directly related to performing multiple cache line flush operations are depicted.

In operation, when a single-line write back and invalidate micro instruction 211 is provided to the cache unit 220, then the write back logic 221 directs the bus unit 230 to issue a corresponding data write transaction 303, DATA WRITE [EAX], over the bus 240 that contains the modified contents of the specified cache line. Hence, according to the three successive CLFLUSH instructions 211 provided to the cache unit 220, three successive data write transactions 303 are issued to the memory bus 240 according to the current status of other pending operations which are already requesting cache resources and associated bus transactions.

As alluded to above, the present inventors have observed that present data microprocessor architectures and associated instruction sets are problematic in the sense that they do not provide for efficient write back and invalidation of data areas that occupy multiple cache lines. On one extreme, the are forced to program a number of single-line flush instructions that is equal to the number of cache lines within a given data area, which wastes valuable memory resources, or they must suffer the disadvantageous effects of flushing all modified cache lines to memory. The present inventors thus recognize a need to provide a single instruction that directs a microprocessor to flush a specified number of cache lines from cache 222 to memory 242. Because of this need, the present invention is directed toward an apparatus and method for directing a microprocessor to write back and invalidate a specified number of cache lines via a single macro instruction. The present invention will now be discussed with reference to FIGS. 4–8.

Turning to FIG. 4, a block diagram is presented showing an extended block write back and invalidate macro instruction 400 according to the present invention. The extended block write back and invalidate macro instruction 400 includes an optional plurality of prefix entities 401, one of which is a repeat prefix 901, followed by a prefetch opcode 402, which is followed by an extended address specifier 403, which is followed by an optional address specifier. In one embodiment, each of prefix and extended address entities 401, 403 are 8-bits in size and the prefetch opcode entity 402 is one or two bytes in size and all entities 401–404 conform to the x86 instruction set architecture except as modified herein.

Operationally, the prefetch opcode 402 is a specific opcode value that directs a conforming microprocessor to perform a prefetch operation. In an x86 embodiment, the specify value of the opcode entity 401 is 0F18h. One or more optional prefix entities 401 may be employed to direct a conforming microprocessor to force certain types of additional operations such as repeating the operation for a number of times defined by a counter (e.g., in x86 architecture, the REP prefix 401), forcing an atomic operation (e.g., in x86 architecture, a LOCK prefix), etc. The extended address specifier 403 is employed to specify the specific type of prefetch operation that is to be executed. In an x86 embodiment, the extended address specifier 403 is also known as the ModR/M byte 403. And the optional address specifier 404 is employed to specify additional addressing data such as the address, in memory, of a specified cache line. In an embodiment that employs an existing prefetch instruction 400, the present invention contemplates use of a repeat prefix 401 to direct that multiple cache lines be flushed from cache to memory. In an embodiment that employs a spare opcode 402 within an existing instruction set, the repeat prefix 401 is not required.

When a block write back and invalidate macro instruction 400 is detected by a microprocessor according to the present invention, the microprocessor is directed to issue write back and invalidate bus transactions to flush a specified number of cache lines from cache to memory according to a hint value prescribed by contents of the extended address specifier 403, an example of which will now be discussed with reference to FIG. 5.

FIG. 5 is a table 500 illustrating how one embodiment of an extended address specifier field 403 within the extended prefetch instruction 400 of FIG. 4 is encoded to direct a microprocessor according to the present invention to write back and invalidate a specified number of cache lines from cache to memory. For the purposes of teaching the present invention, ModR/M bit fields conforming to the x86 architecture are employed, however, it is contemplated that the present invention comprehends any architecture providing the means whereby a prefetch-write back and invalidate hint may be encoded into an instruction 400. Although the example of FIG. 5 is directed toward encoding the prefetch-write back hint into an extended address specifier 403 of an existing prefetch instruction 400, one skilled in the art will appreciate that the write back hint could as well be encoded as a specific opcode value in an opcode field 401.

In the exemplary encoding, an x86 ModR/M byte encodes the type of prefetch operation prescribed by a prefetch opcode 401 in bits 5:3 of the ModR/M byte. Presently, the x86 prefetch instruction allows values 000, 001, 010, and 011 to prescribe prefetch hints that are intended for read operations. All four values 000–011 direct an x86 microprocessor to prefetch data into its caches with varying degrees of closeness. For example, a To hint (i.e., value 001), directs the microprocessor to prefetch a cache line into all levels of cache hierarchy, while an NTA hint directs the microprocessor to prefetch a cache line into a non-temporal cache structure and into a location close to the processor, while minimizing cache pollution. One embodiment of the present invention encodes an additional write back and invalidate hint in the extended address specifier 403 that directs a microprocessor according to the present invention to execute a write back and invalidate operation for a prescribed cache line. FIG. 5 shows the write back hint encoding as value 100 in bits 5:3 of an x86 ModR/M byte. When the write back hint is encoded in a prefetch instruction 400 according to the present invention, a conforming microprocessor is directed to issue transactions over a memory bus to write back data corresponding to a specified cache line. In an x86 embodiment, the specific transaction that is issued responsive to a write back hint in the prefetch instruction 400 is a data write transaction, such as has been previously described with reference to FIG. 3. In one embodiment, the address of the specified cache line is encoded within the optional address specifier 404. In another embodiment, the address of the specified cache line is stored within an architectural register in the microprocessor.

In the x86 instruction set architecture, encoding of bits 5:3 as 100 has heretofore been declared illegal, as is shown in the table 500 for values 101–111. An illegal ModR/M byte encoding results in an exception. But in an x86 embodiment according to the present invention, the additional encoding to perfect a write back hint is considered legal and will result in the aforementioned bus transactions to write back and invalidate the specified cache line.

It is contemplated that the block write back and invalidate instruction 400 of FIGS. 4 and 5 be employed to flush significant numbers of cache lines from cache to memory. Accordingly, in one embodiment, the instruction 400 directs a conforming microprocessor to retrieve the number of cache lines that are to be flushed from a register (not shown), where the number has been previously entered in the register by a preceding macro instruction. In an x86 embodiment, the register comprises architectural register ECX.

It is acknowledged that since the interaction of cache structures with memory is removed from the flow of instructions through a microprocessor pipeline, the instruction 400 can only request that prefetching be performed according to the hints provided. If a cache is not presently occupied with other memory accesses, then the prescribed write back and invalidate operations are immediately executed. But if a cache is otherwise busy, these operations are deferred until such a time as when they can be executed.

Now referring to FIG. 6, a block diagram is presented detailing a microprocessor 600 according to the present invention for performing a block write back and invalidate operation. The microprocessor 600 has three notable stage categories: fetch, translate, and execute. The fetch stage has fetch logic 601 that retrieves macro instructions into an instruction cache 602 from an instruction memory 603. The retrieved macro instructions are provided to the translate stage via an instruction queue 604. The translate stage has translation logic 606 that is coupled to a micro instruction queue 608. The translation logic 606 includes extended translation logic 607. The execute stage has execution logic 609 that includes an extended cache unit 610. The extended cache unit 610 has a data cache 611, that is coupled to extended write back logic 612. The extended write back logic 612 is coupled to a bus unit 613. The bus unit 613 is coupled to a data memory 614.

In operation, the fetch logic 601 retrieves formatted instructions according to the present invention into the instruction cache 602 from the instruction memory 603, and provides the macro instructions in the instruction queue 604 in execution order. The macro instructions are retrieved from the instruction queue 604 and are provided to the translation logic 606. The translation logic 606 translates each of the provided macro instructions into a corresponding micro instruction sequence that directs the microprocessor 600 to perform the operations prescribed by the macro instructions. The extended translation logic 607 detects extended block write back and invalidate macro instructions according to the present invention and also provides for translation of corresponding extended prefixes and address specifier entities. In an x86 embodiment, the extended translation logic 607 is configured to detect an x86 prefetch instruction and to translate the ModR/M byte of the x86 prefetch instruction according to the conventions described with reference to FIGS. 4–5 into a block write back and invalidate micro instruction sequence directing the microprocessor 600 to write back and invalidate a prescribed number of cache lines from cache 611 to memory 614, where the number is prescribed within architectural register ECX.

The micro instructions are routed from the micro instruction queue 608 to the execution logic 609, wherein the extended cache unit 610 is configured to execute a block write back and invalidate operation according to the present invention. When a block write back and invalidate micro instruction sequence is executed by the execution logic 609, the extended write back logic 612 directs the bus unit 613 to issue transactions over a memory bus 615 to the data memory 614 that flushes the data in the specified number of cache lines back to memory 614.

One skilled in the art will appreciate that the microprocessor 600 described with reference to FIG. 6 is a simplified representation of a pipeline microprocessor 600 according to the present invention. In fact, as alluded to above, today's pipeline microprocessor architectures comprise many pipeline stages. However, these stages can be generally categorized into the three stage groups shown in the block diagram and thus, the block diagram of FIG. 6 serves to teach the essential elements that are required to implement embodiments of the present invention as described hereinabove. Those elements of a microprocessor 600 which are extraneous to the present discussion, for clarity, are not depicted.

Referring to FIG. 7, a block diagram 700 is presented depicting a cache unit interface to memory for performing a block write back and invalidate operation within the microprocessor of FIG. 6. The block diagram 700 shows logic within the microprocessor 701 that is employed to perform the block write back and invalidate operation. The microprocessor 701 has an extended translator 710 that receives a flow of macro instructions 702 and translates the macro instructions 702 into associated micro instructions 711. Micro instructions 711 that direct data load and store operations from and to memory 742 are subsequently provided to an extended cache unit 720. The extended cache unit 720 includes extended write back logic 721 and a data cache 722. The extended write back logic 721 is coupled to a bus unit 730. The bus unit 730 interfaces to a system memory bus 740, to which the data memory 742 and other bus agents 741 are coupled.

An exemplary flow of macro instructions 702 illustrates how a block write back and invalidate operation is prescribed. Accordingly, a first macro instruction 702, MOV ECX,COUNT, directs the microprocessor 701 to load a number specifying the number of cache lines to be flushed into architectural register ECX 712. Following this macro instruction 702 is a block write back and invalidate instruction 702, REP.PREF.WB [EAX], that directs the microprocessor 701 to write back and invalidate a specified number of cache lines from cache 722 to memory 742, where the specified number is stored in register ECX 712, and where the addresses of the specified number of cache lines includes an address prescribed in register EAX (not shown). In one embodiment, the address prescribed in EAX is an address of a first cache line in the specified number and addresses increase according to cache line width. Alternatively, another embodiment prescribes the address in EAX as a last cache line where addresses for remaining cache lines in the specified number decrease.

The translator 710 translates the first macro instruction 702 into a load micro instruction 711, LD ECX,COUNT, directing that a value indicating the specified number, COUNT, be loaded into register ECX 712. As this micro instruction does not require memory access, it is passed to logic (not show) that executes the load operation to load the specified number into ECX 712. The present invention provides a shadow count register 713, SHECX, as well, to which contents of ECX 712 are transparently copied so that subsequent instructions can modify contents of ECX 712 without perturbing the block write back and invalidate operation.

After translation of the first macro instruction 702, the translator translates the block write back and invalidate instruction 702 into a corresponding block write back and invalidate micro instruction 711, REP.PREF.WB [EAX], which is provided to the extended cache unit 720. The extended write back logic 721 reads the address of a cache line within the cache line block from EAX (not shown) and retrieves the specified number of cache lines in the block to be flushed from SHECX 713. Then the extended write back logic 721 directs the bus unit 730 to issue data write transactions over the memory bus 740 to write back data for all of the cache lines in the cache line block.

Figure 8:
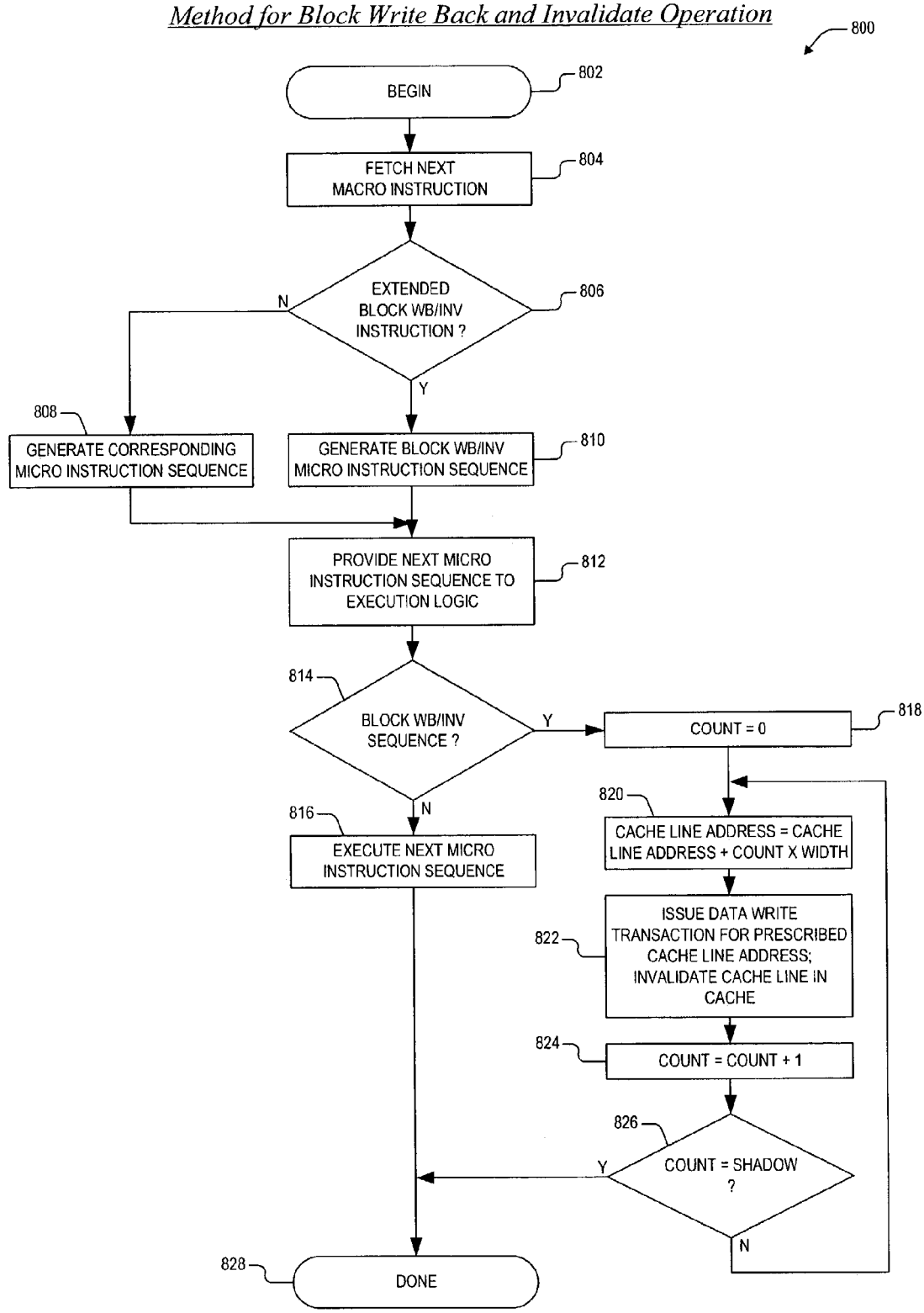
FIG. 8 is a flow chart illustrating a method according to the present invention for performing a block write back and invalidate operation.

Now turning to FIG. 8, a flow chart 800 is presented illustrating a method according to the present invention for performing a block write back and invalidate operation.

Flow begins at block 802 where a flow of macro instructions is provided to an instruction queue according to the present invention. Flow then proceeds to block 804.

At block 804, a next macro instruction is fetched from the instruction queue and provided to an extended translator. Flow then proceeds to decision block 806.

At decision block 806, an evaluation is made to determine if the next macro instruction is an extended block write back and invalidate instruction. If so, then flow is directed to block 810. If not, then flow proceeds to block 808.

At block 810, a detected block write back and invalidate instruction is translated into a block write back and invalidate micro instruction sequence that directs a microprocessor to write back and invalidate a specified number of cache lines. For purposes of teaching the method, it is presumed that the specified number has been previously loaded into register in the microprocessor and has been transparently copied into a shadow count register. Flow then proceeds to block 812.

At block 808, the macro instruction is translated into a corresponding micro instruction sequence directing the microprocessor to perform a specified operation. Flow then proceeds to block 812.

At block 812, a next micro instruction sequence is provided to execute logic in the microprocessor. Flow then proceeds to decision block 814.

At decision block 814, the next micro instruction sequence is evaluated to determine if it is a block write back and invalidate sequence. If so, then flow is directed toward block 818. If not, then flow proceeds to block 816.

At block 816, the next micro instruction sequence is executed. Flow then proceeds to block 828.

At block 818, responsive to the block write back and invalidate sequence, a temporary counter is initialized to zero to monitor the number of cache lines that will be written back into memory by issuing appropriate transactions over a memory bus. Flow then proceeds to block 820.

At block 820, a first cache line address is prescribed for a first cache line requiring write back bus transactions. The first cache line address is derived from an address prescribed by the extended write back and invalidate instruction, to which is added a cache line width multiplied by the count of block 818. Since the count is initialized to zero, the first cache line address is equal to that prescribed by the block write back and invalidate instruction. Flow then proceeds to block 822.

At block 1322, a data write transaction is issued over the memory bus to write back the data of a cache line to memory and the cache line is set to the invalid MESI state within local cache. Flow then proceeds to block 824.

At block 824, the count is incremented and flow is directed to decision block 826.

At decision block 826, an evaluation is made to determine is the incremented count is equal to the number of cache lines to be flushed, as stored in the shadow register. If not, flow proceeds to block 820, where another iteration is executed to flush a next cache line. If count equals contents of the shadow register, then all prescribed cache lines have been flushed and flow is directed to block 828.

At block 828, the method completes.

Although the present invention and its objects, features, and advantages have been described in detail, other embodiments are encompassed by the invention as well. For example, the present invention has been characterized herein as providing advantages flushing a specified number of cache lines from cache to memory in accordance with the MESI protocol. MESI has been selected to exemplify the present invention because of its prevalent use in the art. However, it is noted that the present invention provides for flushing of cache data from a local cache in such a form, or state, that corresponding bus transactions can be prescribed responsive to a block write back and invalidate instruction. Whether that form or state accords with MESI is inconsequential.

As noted earlier, cache line width varies according to architecture. In desktop systems, 32-byte cache lines prevail today. But such representation of the present invention is not intended to restrict its application to 32-, 64-, 128-, or even 256-byte cache lines. On the contrary, it is contemplated that the present invention is applicable to any system architecture that allows for flushing of local cache lines and which does not otherwise provide for specification of a number of cache lines within a block to be flushed.

Furthermore, the present invention has been illustratively described with reference to embodiments conforming to the x86 architecture. Certainly, x86-compatible microprocessors will benefit from incorporation of the present invention, but it is noted that the scope of the present invention extends beyond the boundaries of the x86-compatible community because many different architectures preclude a programmer from specifying by a single instruction that a prescribed number of cache lines be written back to memory and invalidated in a local cache.

Finally, it is noted that although an address specifier is employed herein to specify an address of a cache line within a block to be flushed, such specification need not be explicit. An embodiment of a write back and invalidate instruction according to the present invention could implicitly specify an architectural register that contains the address, where a prior instruction is executed to load the address into the architectural register.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A microprocessor apparatus, providing for write back and invalidation of a block of data from cache to memory, the apparatus comprising:
   translation logic, configured to translate a block write back and invalidate instruction into a micro instruction sequence that directs a microprocessor to write back and invalidate a specified number of cache lines, wherein said specified number has been previously entered in a register in said microprocessor by a preceding micro instruction, and wherein said block write back and invalidate instruction comprises a modification to an existing prefetch instruction within an existing instruction set, and wherein said existing prefetch instruction does not otherwise provide for write back and invalidation of said specified number of cache lines; and
   execution logic, coupled to said translation logic, configured to receive said micro instruction sequence, and configured to issue transactions over a memory bus that write back data corresponding to said specified number of said cache lines.

2. The microprocessor apparatus as recited in claim 1, wherein write back and invalidation of said specified number of cache lines occurs in parallel with execution of other instructions in a program flow of an application program.

3. The microprocessor apparatus as recited in claim 1, wherein said existing instruction set comprises the x86 instruction set and wherein said existing prefetch instruction comprises the x86 prefetch instruction.

4. The microprocessor apparatus as recited in claim 1, wherein said block write back and invalidate instruction comprises a repeat prefix and a prefetch opcode field within an extended address specifier entity, and wherein a specific value of said prefetch opcode field directs said microprocessor to write back and invalidate a first cache line, and wherein other values of said prefetch opcode field direct said microprocessor to execute other types of prefetch operations according to said existing instruction set.

5. The microprocessor apparatus as recited in claim 4, wherein said prefetch opcode field comprises bits 5:3 within the ModR/M byte of an x86 prefetch instruction.

6. The microprocessor apparatus as recited in claim 5, wherein said repeat prefix field directs said microprocessor to write back and invalidate said specified number of cache lines, and wherein said specified number of cache lines comprises said first cache line.

7. The microprocessor apparatus as recited in claim 6, wherein said register comprises an architectural register within said microprocessor.

8. The microprocessor apparatus as recited in claim 1, wherein, responsive to said micro instruction sequence, said execution logic directs a bus unit to issue said transactions over said memory bus.

9. The microprocessor apparatus as recited in claim 8, wherein said transactions comprise a plurality of data write transactions.

10. The microprocessor apparatus as recited in claim 9, wherein contents of a first architectural register containing said specified number are transparently copied into a shadow register, and where said execution logic employs said shadow register to count said specified number of cache lines.

11. The microprocessor apparatus as recited in claim 8, wherein said memory bus conforms to the x86 architecture.

12. An apparatus in a microprocessor for performing a block write back and invalidate operation, the apparatus comprising:
   a block write back and invalidate instruction, configured to direct the microprocessor to write back and invalidate a prescribed number of cache lines, wherein said prescribed number has been previously entered into a register in the microprocessor by an preceding micro instruction, and wherein said block write back and invalidate instruction comprises a modification to an existing prefetch instruction within an existing instruction set, and wherein said existing prefetch instruction does not otherwise provide for write back and invalidation of said prescribed number of cache lines; and
   a translator, configured to receive said block write back and invalidate instruction, and configured to translate said block write back and invalidate instruction into associated micro instructions, wherein said associated micro instructions direct execution logic within the microprocessor to issue bus transactions over a memory bus that writes back data corresponding to said prescribed number of cache lines.

13. The apparatus as recited in claim 12, wherein write back and invalidation of said prescribed number of cache lines is performed in parallel with execution of other program instructions in a program flow.

14. The apparatus as recited in claim 12, wherein said existing instruction set comprises the x86 instruction set and wherein said existing prefetch instruction comprises the x86 prefetch instruction with a repeat prefix.

15. The apparatus as recited in claim 12, wherein said block write back and invalidate instruction comprises a repeat field, and a prefetch opcode field within an extended address specifier entity, and wherein a specific value of said prefetch opcode field directs the microprocessor to write back and invalidate a first cache line, and wherein other values of said prefetch opcode field direct the microprocessor to execute other types of prefetch operations according to said existing instruction set.

16. The microprocessor mechanism as recited in claim 15, wherein said repeat prefix field directs the microprocessor to write back and invalidate said prescribed number of cache lines, and wherein said prescribed number of cache lines comprises said first cache line.

17. The microprocessor mechanism as recited in claim 16, wherein said register comprises and architectural register within the microprocessor.

18. The apparatus as recited in claim 15, wherein said prefetch opcode field comprises bits 5:3 of an ModR/M byte within an x86 prefetch instruction.

19. The apparatus as recited in claim 12, wherein, responsive to said associated micro instructions, said execution logic directs a bus unit to issue said bus transactions over said memory bus.

20. The apparatus as recited in claim 19, wherein said bus transactions comprise a plurality of data write transactions.

21. The microprocessor apparatus as recited in claim 20, wherein contents of said register specifying said prescribed number are transparently copied into a shadow register, and wherein said execution logic employs said shadow register to count said prescribed number of cache lines.

22. The apparatus as recited in claim 12, wherein said memory bus conforms to the x86 architecture.

23. A method for flushing a block of cache lines, comprising:

retrieving a block write back and invalidate macro instruction, wherein said retrieving comprises:

providing the block write back and invalidate instruction as a modification of an existing prefetch instruction within an existing instruction set, wherein the existing prefetch instruction does not otherwise provide for write back and invalidation of the block cache lines;

translating the block write back and invalidate macro instruction into a micro instruction sequence, wherein the micro instruction sequence directs a microprocessor to write back and invalidate the block of cache lines, and wherein the number of cache lines in the block has been previously entered in a register in the microprocessor by a preceding micro instruction; and responsive to the micro instruction sequence, invalidating each cache line in the block of cache lines in a local cache, and issuing bus transactions over a memory bus to write back data corresponding to each of the cache lines to memory.

24. The method as recited in claim 23, wherein said issuing comprises:

allowing the microprocessor to execute following instructions in parallel with said issuing.

25. The method as recited in claim 23, wherein said providing comprises:

modifying an x86 prefetch instruction to enable specification of a write back and invalidate operation.

26. The method as recited in claim 25, wherein the extended prefetch instruction comprises a repeat prefix, and a prefetch opcode field within an extended address specifier entity, and wherein a specific value of the prefetch opcode field directs the microprocessor to write back and invalidate the block of cache lines, and wherein other values of the prefetch opcode field direct the microprocessor to execute other types of prefetch operations according to the existing instruction set.

27. The method as recited in claim 26, wherein the prefetch opcode field comprises bits 5:3 of an x86 ModR/M byte within an x86 prefetch instruction.

28. The method as recited in claim 23, further comprising:

prescribing the number of cache lines by contents of an architectural register.

29. The method as recited in claim 28, further comprising:

transparently copying the contents of the architectural register into a shadow register.

30. The method as recited in claim 29, wherein said issuing comprises:

providing a plurality of data write transactions over the memory bus.

\* \* \* \* \*